US005722058A

United States Patent [19]

Umemoto et al.

[11] Patent Number: 5,722,058

[45] Date of Patent: Feb. 24, 1998

[54] ON-VEHICLE RECEIVING SYSTEM

[75] Inventors: Toshiaki Umemoto; Takayuki Tamura, both of Iwaki, Japan

[73] Assignee: Alpine Electronics, Inc., Tokyo, Japan

[21] Appl. No.: 400,060

[22] Filed: Mar. 7, 1995

[30] Foreign Application Priority Data

Mar. 10, 1994 [JP] Japan ........................ 6-039598

[51] Int. Cl.[6] ........................ H04B 17/02

[52] U.S. Cl. ........................ 455/140; 455/345; 455/352; 340/825.72

[58] Field of Search ........................ 455/66, 88, 127, 455/140, 277.1, 278.1, 345, 352, 353, 132, 89–90, 277.2, 133–135, 142, 143, 290; 343/876, 1–32; 340/825.03, 825.16, 825.31, 825.34, 425.5, 426, 825.4, 825.69, 825.72, 825.76; 180/287; 307/10.1, 10.2; H01Q 1/32

[56] References Cited

U.S. PATENT DOCUMENTS

| | | | |
|---|---|---|---|
| 3,725,942 | 4/1973 | Ukmar | 455/132 |
| 4,106,025 | 8/1978 | Katz | 455/290 |
| 4,160,955 | 7/1979 | Sato | 455/143 |
| 4,673,921 | 6/1987 | Saito et al. . | |
| 4,835,531 | 5/1989 | Sato . | |
| 5,134,392 | 7/1992 | Takeuchi et al. | 340/825.31 |
| 5,239,688 | 8/1993 | Dorrie et al. | 455/74 |
| 5,239,697 | 8/1993 | Kosuga | 455/133 |
| 5,258,728 | 11/1993 | Taniyoshi et al. | 333/132 |
| 5,361,403 | 11/1994 | Dent | 455/74 |
| 5,379,033 | 1/1995 | Fujii et al. | 340/825.31 |
| 5,392,462 | 2/1995 | Komaki . | |
| 5,444,761 | 8/1995 | Nagashima | 455/38.3 |

*Primary Examiner*—Chi H. Pham
*Assistant Examiner*—Gertrude Arthur
*Attorney, Agent, or Firm*—Guy W. Shoup

[57] ABSTRACT

An on-vehicle receiving system for optimizing the receiving performance of a radio receiver and a remote controlled receiver, whereby a remote-controlled receiver and a radio receiver share an on-vehicle antenna. A key detector for detecting whether an ignition key is fitted into a key cylinder of the vehicle is employed and a selector switch for connecting the on-vehicle antenna selectively to the remote-controlled receiver or the radio receiver are incorporated. When the key detector detects that the ignition key is fitted into the key cylinder, the selector switch selects the radio receiver. When it is detected that the ignition key is not fitted into the key cylinder, the remote-controlled receiver is selected. In one embodiment, a remote-controlled receiver and a radio receiver share not only an on-vehicle antenna but also part of receiving equipment. The remote-controlled receiver and radio receiver can also share the frequency and modulation form employed. In another embodiment, the detector is designed to detect whether the vehicle ACC switch is turned on by the ignition key instead of whether the ignition key is fitted into the key cylinder.

20 Claims, 4 Drawing Sheets

ON-VEHICLE RECEIVING SYSTEM

BACKGROUND OF THE INVENTION

1. Field of the Invention

The present invention relates to an on-vehicle receiving system. More particularly, this invention is concerned with an on-vehicle receiving system including a radio receiver for receiving an AM or FM broadcast or a TV audio broadcast and a remote-controlled receiver for receiving a remote control signal transmitted from a hand-held remote unit to operate a keyless entry system or a vehicle security system.

2. Description of the Related Art

It is inconvenient to have to use a conventional key to lock a door when leaving a vehicle and to have to use the same key to unlock the door when getting into the vehicle. In an effort to alleviate this nuisance, keyless entry systems have been developed. With a keyless entry system, when a user presses a lock button on a hand-held remote unit after getting out of the vehicle, a radio signal carrying a remote control signal that represents a lock command is propagated. The radio signal carrying the remote control signal is received by an antenna mounted on the vehicle and then fed to a remote-controlled receiver in the keyless entry system. The remote control signal is then received and modulated. Based on the resulting remote control signal, a controller controls a door lock device so that the door lock device locks the door. Further, when an unlock button on the hand-held remote unit is pressed in the vicinity of the vehicle, a radio signal carrying a remote control signal that represents an unlock command is propagated. The radio signal is received by the antenna, and then fed to the remote-controlled receiver in the keyless entry system. The remote control signal is then received and modulated. The controller then controls the door lock device so that the door lock device unlocks the door.

An on-vehicle radio set is installed in almost all vehicles so that drivers can enjoy AM or FM broadcasts or TV audio broadcasts. In an effort to offer improved receiving performance with this kind of on-vehicle radio set, an antenna is usually installed in an elevated place on the vehicle by placing a pole upright on a front pillar or rear trunk of the vehicle or by attaching a metallic-foil pattern to a rear or front window of the vehicle.

However, when an on-vehicle radio set and a keyless entry system are both installed in a vehicle, an antenna dedicated to the radio set which affords high receiving performance must be placed with higher priority outside the vehicle or on a window of the vehicle. Therefore, if an antenna dedicated to the keyless entry system is also placed outside the vehicle or on the window, the streamlined appearance of the vehicle is impaired and the possibility of breaking the antennas increases. In addition, the driver's field of vision can become too narrow. The antenna dedicated to the keyless entry system must therefore be installed inside the vehicle despite degraded receiving performance. In addition, it is not cost-effective to provide an antenna for both a radio set and a keyless entry system.

The same problem arises when a vehicle security system, or any other on-vehicle remote-controlled unit is installed together with an on-vehicle radio set.

SUMMARY

According to the invention, an on-vehicle receiving system for optimizing the receiving performance of a radio receiver and a remote controlled receiver are provided with no restriction imposed on the antenna installation site.

According to the present invention, a remote-controlled receiver and a radio receiver share an on-vehicle antenna. A key detector (also called a detector) for detecting whether an ignition key is fitted into a key cylinder of the vehicle is provided as well as a selector switch for connecting the on-vehicle antenna selectively to the remote-controlled receiver or the radio receiver. According to the invention, when the key detector detects that the ignition key is fitted into the key cylinder, the selector switch selects the radio receiver. When the key detector detects that the ignition key is not fitted into the key cylinder, the remote-controlled receiver is selected. Thus, according to the present invention, it is determined whether an ignition key is fitted into a key cylinder. When it is determined that the ignition key is fitted into the key cylinder, the on-vehicle antenna is switched over to the radio receiver. When the ignition key is not fitted into the key cylinder, the on-vehicle antenna is switched over to the remote-controlled receiver.

Thus, the radio receiver and the remote-controlled receiver can share a single on-vehicle antenna. Once the on-vehicle antenna is installed in an optimal place on the vehicle, the remote-controlled receiver and the radio receiver can provide excellent receiving performance. The system according to the invention is therefore cost-effective. Furthermore, a user is relieved from a manual switching operation. Specifically, the on-vehicle antenna can be automatically switched over to whichever must be activated: the remote-controlled receiver or radio receiver. This is quite convenient.

According to one embodiment of the invention, a remote-controlled receiver and a radio receiver share not only the on-vehicle antenna but also part of the receiving equipment. In addition, a key detector for detecting whether an ignition key is fitted into a key cylinder and a selector for selectively connecting the on-vehicle antenna to the shared part of receiving equipment to the remote-controlled receiver and radio receiver are incorporated. When the key detector detects that the ignition key is fitted into the key cylinder, the selector selects the radio receiver. When it is not detected that the ignition key is fitted into the key cylinder, the remote-controlled receiver is selected.

The remote-controlled receiver and radio receiver can share not only the on-vehicle antenna but also the frequency and modulation form employed. This results in a reduction in cost.

In one embodiment of the invention, the detector detects whether an ACC switch is turned on by means of the ignition key (i.e., the ignition is turned to the ACC position) instead of whether the ignition key is fitted into the key cylinder (an ACC switch is installed in virtually all vehicles). When the detector detects that the ACC switch is turned on, the selector selects the radio receiver. When it is detected that the ACC switch is off, the remote-controlled receiver is selected. Using the ACC switch, the present invention can be implemented even in a vehicle not having a switch for use in determining whether the ignition key is fitted into the key cylinder.

DETAILED DESCRIPTION OF THE PREFERRED EMBODIMENTS

Figure 1:
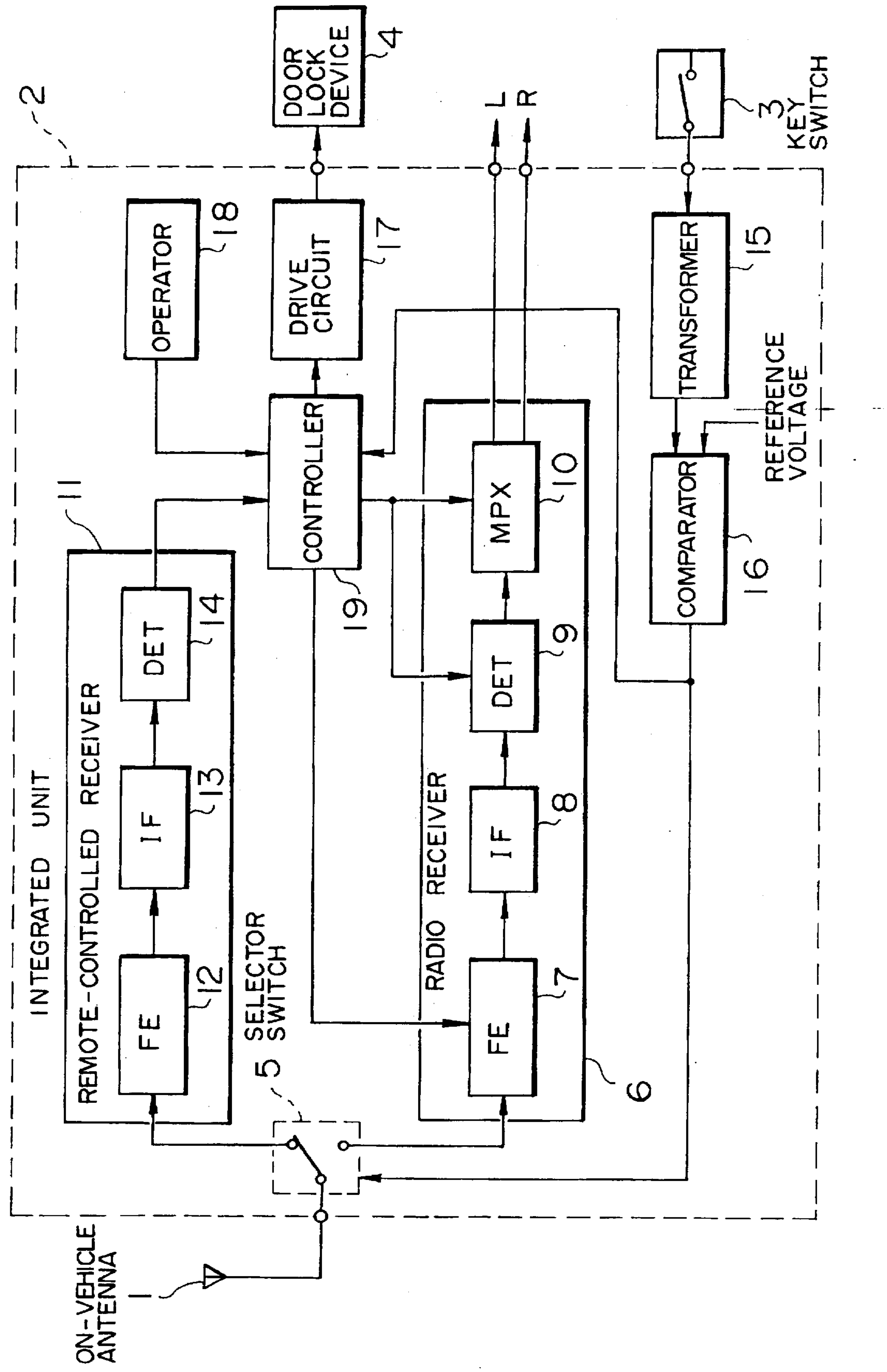
FIG. 1 is a block diagram of one embodiment of the present invention.

FIG. 1 is a block diagram of one embodiment of the present invention. In FIG. 1, an on-vehicle radio set and a keyless entry system are integrated into a single unit 2.

An on-vehicle antenna 1 is realized by placing a metallic pole upright on a front pillar or rear trunk of the vehicle or by attaching a metallic-foil pattern on a rear window of the vehicle. A single on-vehicle antenna is shared by the radio set and the keyless entry system. An integrated unit 2 has the capabilities of a radio set and keyless entry system. A key switch 3 is incorporated in a key cylinder (the key cylinder is not shown). When an ignition key is fitted into the key cylinder (not shown), a connection is made by switch 3 so that an output of +12 V is provided. When the ignition key is not fitted into the key cylinder, the connection is broken so that an output of 0 V is provided. A door lock device 4 for locking or unlocking a door of the vehicle is also provided.

A selector switch 5 is connected to the on-vehicle antenna 1 which is controlled according to a detection signal sent from a comparator that will be discussed below. A radio receiver 6 is provided as well as a front-end processor 7 with a tuning frequency which is variable within a frequency band including an AM or FM broadcast band and which receives an intended broadcasting signal and converts it into an intermediate frequency signal. An intermediate frequency amplifier 8 is included as well as a detector 9 for detecting an AM or FM signal in an intermediate frequency (IF) signal. A multiplexer 10 is provided and a remote-controlled receiver 11. A front-end processor 12 with a tuning frequency which is fixed and which receives a radio signal carrying a remote control signal and converts it into an intermediate frequency signal is also included. An intermediate frequency (IF) amplifier 13 and a detector 14 based on a given modulation form which is consistent with the modulation form adopted for modulating the radio signal carrying the remote control signal are provided.

A transformer 15 transforms a voltage of +12 V supplied from the key switch 3 into a voltage of +5 V. A comparator 16 for providing a detection signal indicating whether the ignition key is fitted into the key cylinder is provided. Upon receiving +5 V from the transformer 15, the comparator 16 provides a high-level signal. Upon receiving 0 V, the comparator 16 provides a low-level signal. The key switch 3, transformer 15, and comparator 16 constitute a key detector for detecting whether or not the ignition key is fitted into the key cylinder. A drive circuit 17 is provided for driving the door lock device 4 under the control of a controller, which will be discussed below, and for allowing the door lock device 4 to lock or unlock a door. An radio interface 18 for selecting a radio broadcasting station or selecting an AM or FM mode is also provided.

A controller 19 that is based on a microcomputer and is responsible for overall system control is provided so that when the comparator 16 sends a high level detection signal indicating that the ignition key is fitted into the key cylinder, the controller 19 controls the radio receiver 6 according to an action of the radio interface 18 (more particularly, the controller controls tuning of the front-end processor 7 or controls the selecting of the AM or FM mode for the detector 9 and multiplexer 10). When the comparator 16 supplies a low level detection signal indicating that the ignition key is not fitted into the key cylinder, the controller 19 controls a remote control unit. In particular, the controller 19 decodes a remote control signal in response to a detection signal sent from the detector 14 and controls the drive circuit 17 according to the resultant remote control signal so that the drive circuit 17 actuates the door lock device 4. Controller 19 includes an operation program. A program capable of operating controller 19 having the functionality disclosed herein is easily provided by those skilled in the art.

A radio signal carrying a remote control signal is transmitted from a hand-held remote unit (not shown). The integrated unit 2 is always energized by a battery (not shown) irrespective of the on or off state of an ACC switch (not shown). Moreover, when receiving a high-level signal from the comparator 16, the selector switch 5 is switched over to the radio receiver 6. When receiving a low-level signal, the selector switch 5 is switched over to the remote-controlled receiver 11.

The operation of the above discussed embodiment of the invention is as follows. When the driver fits the ignition key into the key cylinder, the key switch 3 is made. The key switch 3 provides a signal of +12 V and the transformer 15 converts this signal into a signal of +5 V. As a result, comparator 16 supplies a high-level signal indicating that the ignition key is fitted into the key cylinder. Then, the selector switch 5 is switched over to the radio receiver 6 and the on-vehicle antenna 1 is connected to the radio receiver 6, thereby enabling the radio receiver 6 to receive a broadcast signal. At this time, the controller 19 ignores any signal fed from the remote control receiver 11 and controls the signal receiving function of the radio receiver 6 according to the action of the radio interface 18. The on-vehicle antenna 1 is conventionally located at an elevated place on the vehicle, therefore the driver can enjoy a radio broadcast with excellent receiving performance.

When the driver removes the ignition key from the key cylinder to get out of the vehicle, the key switch 3 connection is broken. In this state, the key switch 3 provides a signal of 0 V and the transformer 15 5 provides a signal of 0 V. The comparator 16 therefore supplies a low-level signal indicating that the ignition key is not fitted into the key cylinder. The selector switch 5 is then switched over to the remote-controlled receiver 11 and the on-vehicle antenna 1 is connected to the remote-controlled receiver 11, thereby enabling the remote-controlled receiver 11 to receive a signal. In this state, the controller 19 ignores any action of the radio interface 18 and controls a remote control unit according to a predetermined sequence in response to an input from the remote-controlled receiver 6.

After the driver exits the vehicle, closes the door, and presses a lock button on a hand-held remote unit, a remote control signal representing a lock command is delivered by means of a radio signal. The radio signal is received by the on-vehicle antenna 1 and detected by the remote-controlled receiver 11 and then fed to the controller 19. The controller 19 then decodes the remote control signal according to detected information. Since the detected information is a lock command, the controller 19 controls the drive circuit 17 so that the door lock device 4 locks the door.

When returning to the vehicle, the driver presses an unlock button on the hand-held remote unit. A remote control signal representing an unlock command is then delivered by means of a radio signal. The radio signal is received by the on-vehicle antenna 1, detected by the remote-controlled receiver 11, and then fed to the controller 19. The controller 19 decodes the remote control signal according to detected information. Since the detected information is an unlock command, the controller 19 controls the drive circuit 17 so that the door lock device 4 unlocks the door.

Being located at an elevated place, the on-vehicle antenna 1 can reliably receive a radio signal carrying a remote control signal transmitted from the hand-held remote unit and supply it to the remote-controlled receiver 11. Door locking or unlocking can therefore be achieved reliably owing to the excellent receiving performance provided by the elevated antenna.

According to this embodiment of the invention, the single on-vehicle antenna 1 is shared by the radio receiver 6 and remote-controlled receiver 11. Once the on-vehicle antenna 1 is installed in an optimal place on a vehicle, both the remote-controlled receiver 6 and radio receiver 11 exhibit excellent receiving performance. This is cost-effective. Moreover, a driver will not be annoyed with a manual switching operation. Depending on whether a driver enters or leaves a vehicle, the on-vehicle antenna 1 is automatically switched over to whichever must be activated; the radio receiver 6 or remote-controlled receiver 11. This is very convenient.

Furthermore, the radio receiver 6 and remote-controlled receiver 11 share a single on-vehicle antenna without using a distributor. A signal received by the antenna can therefore be supplied to whichever must be activated; the radio receiver 6 or remote control receiver 11, without any power or time losses.

In another embodiment of the invention, the input stage of the transformer 15 is the conventional ACC switch (not shown) incorporated in the key cylinder instead of the key switch 3. When closed, the ACC switch provides a signal of +12 V. When open, the ACC switch provides a signal of 0 V. Thus, when the ACC switch is closed, the comparator 16 provides a high-level signal. The selector switch 5 is therefore switched over to the radio receiver 6. By contrast, when the ACC switch is open, the comparator 16 provides a low-level signal. The selector switch 5 is therefore switched over to the remote-controlled receiver 11. Thus, the on-vehicle antenna 1 can be automatically switched over to whichever must be activated; the radio receiver 6 or remote-controlled receiver 1. An ACC switch is incorporated in virtually every vehicle. Using the ACC switch, the present invention can be implemented even in a vehicle which does not have a key switch 3 (see FIG. 1).

Figure 2:
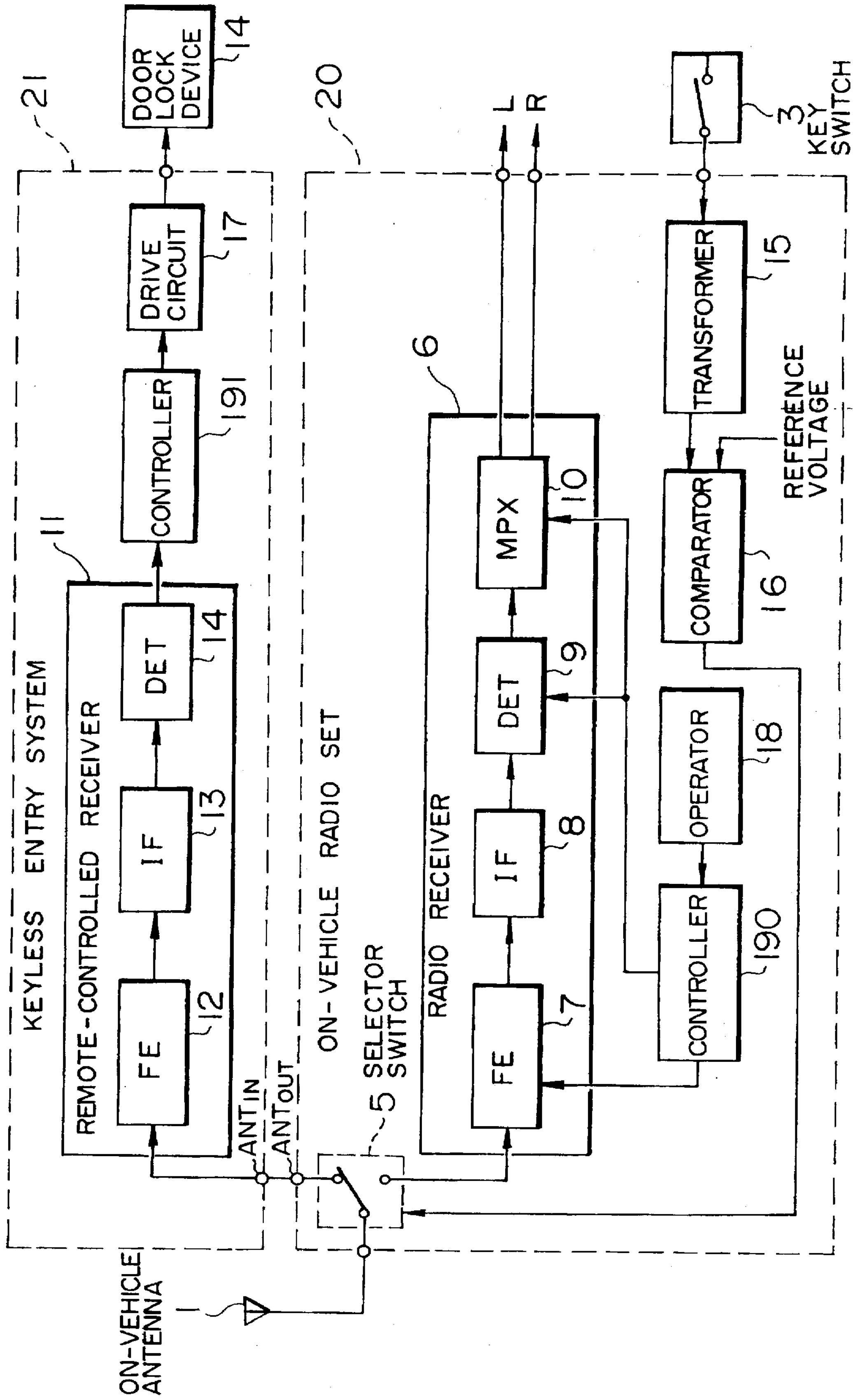
FIG. 2 is a block diagram of a second embodiment of the present invention.

FIG. 2 is a block diagram of an overall configuration of a second embodiment of the present invention. In the second embodiment, the on-vehicle radio set and the keyless entry system are stand-alone units. The components identical to those discussed in connection with FIG. 1 are assigned the same reference numerals.

A separate on-vehicle radio set 20 is provided with this embodiment of the invention along with a separate keyless entry system 21. Each of the units is energized directly by a battery. The on-vehicle radio set 20 includes the selector switch 5, radio receiver 6, transformer 15, comparator 16, and radio interface 18, as well as a controller 190. The input terminal of the voltage is connected to the key switch 3. One terminal of the selector switch 5 is connected to the radio receiver 6, while the other terminal thereof is connected to an ANTin terminal of the keyless entry system 21. The controller 190 controls signal receiving in response to an action of the radio interface 18.

The keyless entry system 21 includes the remote-controlled receiver 11 and drive circuit 17 as well as a controller 191. The input terminal of the remote control receiver is connected to the ANTin terminal. The output terminal of the drive circuit 17 is connected to the door lock device 4. When an ignition key is fitted into the key cylinder and the key switch 3 is made, the selector switch 5 is switched over to the radio receiver 6. This allows reception of a radio broadcast. By contrast, when the key is not fitted into the key cylinder, and the key switch 3 is open, the selector switch 5 is switched over to the keyless entry system 21. This enables the remote-controlled receiver 11 to receive a remote control signal. The controller 191 decodes the remote control signal sent from the remote-controlled receiver 11. If the remote control signal represents a lock command, the controller 191 controls the drive circuit 17 so that the door is locked. If the remote control signal represents an unlock command, the controller 191 controls the drive circuit 17 so that the door is unlocked.

According to this embodiment of the invention, even when a keyless entry system is separately installed in a vehicle with an on-vehicle radio set, the single on-vehicle antenna 1 can be commonly used. This is quite convenient.

Figure 3:
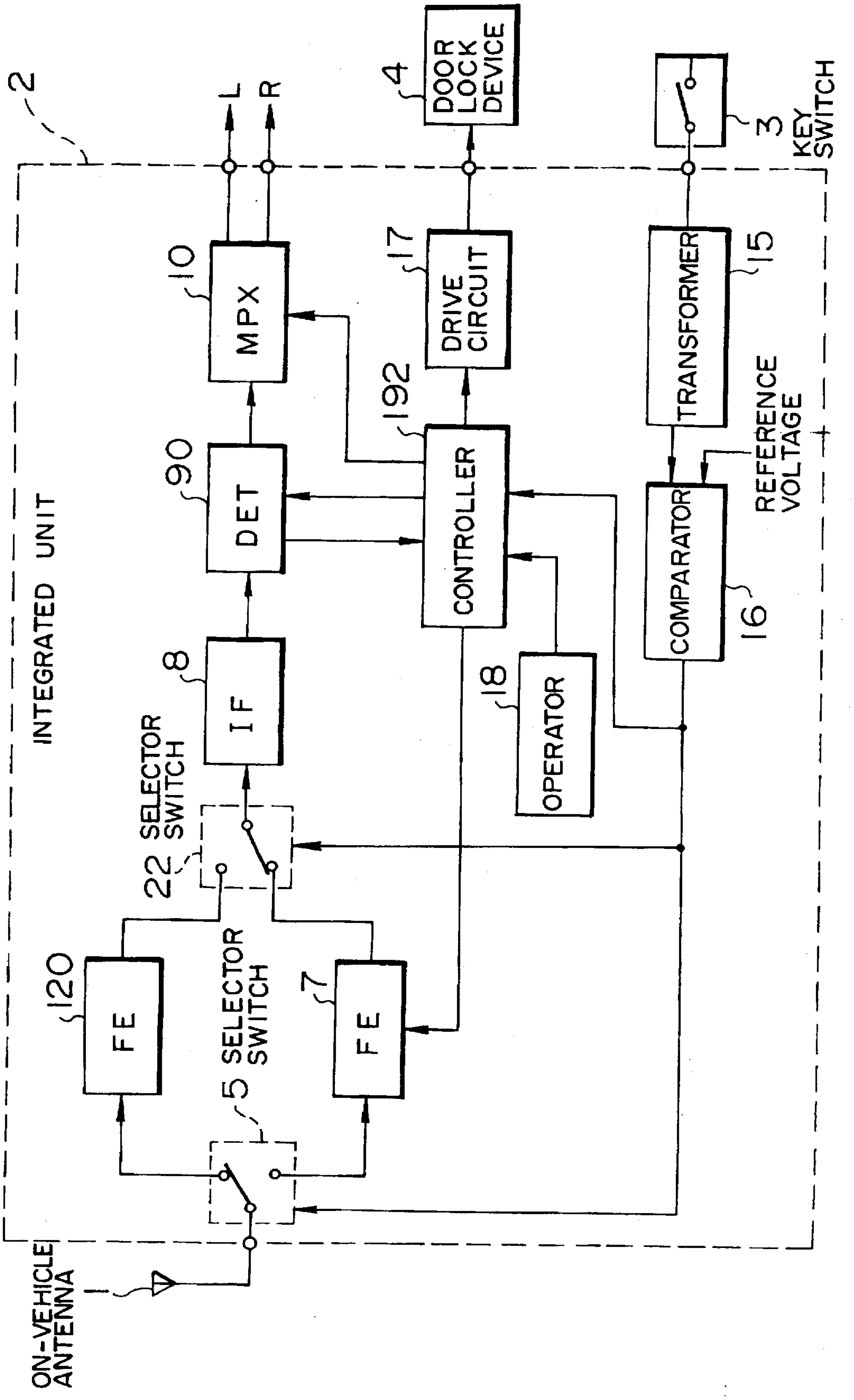
FIG. 3 is a block diagram of a third embodiment of the present invention.

FIG. 3 is a block diagram of an overall configuration of a third embodiment of the present invention. In the third embodiment, the on-vehicle radio set and the keyless entry system use the same intermediate frequency and modulation/demodulation form and share an intermediate frequency amplifier and a detector which are included in receiving equipment. The components identical to those in FIG. 1 are assigned the same reference numerals.

A selector switch 22 is provided for selectively supplying an output signal of a front-end processor 7 in a radio set and an output signal of a front-end processor 120 in a remote control unit to an intermediate frequency amplifier 8. When the comparator 16 provides a high-level signal, the selector switch 22 is switched over to the front-end processor 7 while being interlocked with the selector switch 22. An intermediate frequency signal relating to the radio broadcast is then fed to the intermediate frequency amplifier 8. When the comparator 16 provides a low-level signal, the selector switch 22 is switched over to a front-end processor 120 so that an intermediate frequency signal relating to a remote control signal is fed to the intermediate frequency amplifier 8. The intermediate frequency signals supplied by the front-end processors 7 and 120 represent the same intermediate frequency. The front-end processor 7, selector switch 22, intermediate frequency amplifier 8, detector 90, and multiplexer 10 constitute a radio receiver. The front-end processor 120, selector switch 22, intermediate frequency amplifier 8, and detector 90 constitute a remote-controlled receiver.

A controller 192 is provided for overall control of the integrated unit 2. When receiving a high-level signal from the comparator 16, the controller 192 allows the radio interface 18 to place the phase detector 90 and multiplexer 10 in a driver-selected AM or FM mode and controls tuning of the front-end processor 7 according to the drivers choice of a broadcasting station. The controller 192 ignores an input signal from the detector 90.

By contrast, when receiving a low-level input from the comparator 16, the controller 192 places the detector 90 in either the AM or FM mode consistent with a modulation/demodulation form employed with the keyless entry system and receives a detection signal from the detector 90 so as to decode a remote control signal and control the drive circuit 17 according to the remote control signal so that the door lock device 4 is actuated.

According to the third embodiment of the invention discussed above, when an on-vehicle radio set and a keyless entry system use the same intermediate frequency and modulation/demodulation form, they can share not only the on-vehicle antenna 1 but also the intermediate frequency amplifier 8 and phase detector 90 which are included in receiving equipment. This results in a reduction in cost.

Figure 4:
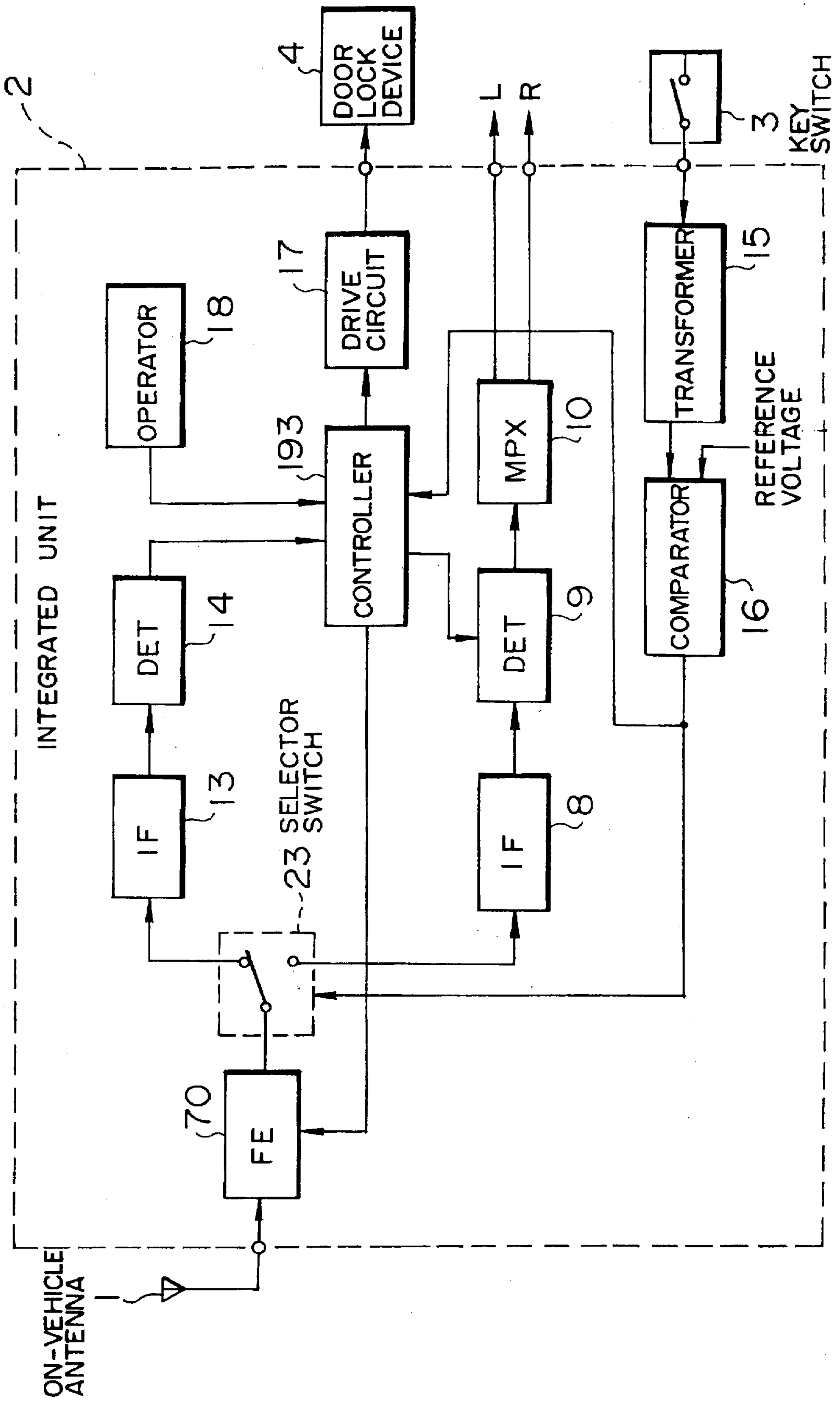
FIG. 4 is a block diagram of a fourth embodiment of the present invention.

FIG. 4 shows an overall configuration of a fourth embodiment of the present invention. In the fourth embodiment, the on-vehicle radio set and the keyless entry system use the same frequencies and share an on-vehicle antenna as well as a front-end processor that is part of receiving equipment. The components identical to those in FIG. 1 are assigned the same reference numerals.

A front-end processor 70 whose tuning frequency is variable within a band containing a frequency employed in the keyless entry system and a selector switch 23 for supplying an output signal of the front-end processor 70 selectively to the intermediate frequency amplifiers 8 and 13 are provided. When the comparator 16 provides a high-level signal, the selector switch 23 is switched over to the intermediate frequency amplifier 8 so that an intermediate frequency signal relating to a radio broadcast is fed to the intermediate frequency amplifier 8. When the comparator 16 provides a low-level signal, the selector switch 23 is switched over to the intermediate frequency amplifier 13 so that an intermediate frequency signal relating to a remote control signal is fed to the intermediate frequency amplifier 13. The front-end processor 70, selector switch 23, intermediate frequency amplifier 8, detector 9, and multiplexer 10 constitute a radio receiver. The front-end processor 12, selector switch 23, intermediate frequency amplifier 13, and detector 14 constitute a remote-controlled receiver. A controller 193 is responsible for the overall control of the integrated unit 2. When receiving a high-level signal from the comparator 16, the controller 193 ignores a detection signal sent from the detector 14, allows the radio interface 18 to place the detector 9 and multiplexer 10 in a driver-selected AM or FM mode, and controls tuning of the front-end processor 70 according to the driver's choice of a broadcasting station.

By contrast, when receiving a low-level signal from the comparator 16, the controller 193 tunes the front-end processor 70 so that the frequency of the front-end processor 70 matches the frequency employed in the keyless entry system. The controller 193 then decodes a remote control signal in response to a detection signal sent from the detector 14 and controls the drive circuit 17 according to the remote control signal so that the door lock device 4 is actuated.

According to the fourth embodiment of the invention discussed above, when the on-vehicle radio set and the keyless entry system employ different modulation/demodulation forms and use the same frequencies, they can share not only the on-vehicle antenna 1 but also the front-end processor 70. This results in a reduction in cost.

In any of the embodiments discussed above, the input stage of the transformer 15 may be the ACC switch instead of the key switch 3. When the antenna tuning circuits in the front-end processors 7 and 70 can be placed in either the AM or FM mode, mode change for the front-end processors 7 and 70 may be interlocked with mode change for the phase detectors 9 and 90. Moreover, even when a vehicle security system is substituted for the keyless entry system, or any other on-vehicle remote-controlled system, the present invention can still be employed. The radio receiver may also be designed to have the ability to receive TV audio broadcasts.

As discussed above, according to the present invention, it is detected whether the ignition key is fitted into the key cylinder. When it is detected that the ignition key is fitted into the key cylinder, an on-vehicle antenna is switched over to an on-vehicle radio set. When it is detected that the ignition key is not fitted into the key cylinder, the on-vehicle antenna is switched over to an on vehicle remote-controlled receiving system. Thus, a single on-vehicle antenna can be shared by the on-vehicle radio set and the on-vehicle remote control receiving system.

As also discussed above, the on-vehicle remote controlled receiving system and on-vehicle radio set can also share part of the receiver equipment. When the on-vehicle remote-controlled receiving system and on-vehicle radio set share part of receiving equipment cost is reduced.

This disclosure is illustrative and not limiting; further modifications will be apparent to one skilled in the art, and are intended to fall within the scope of the appended claims.

What is claimed is:

1. An on-vehicle receiving system, comprising:

a first receiver which receives a first signal;

a second receiver which receives a second signal differing from the first signal;

an antenna, said antenna adapted to receive said first signal and said second signal;

a selector switch coupled to said antenna, said first receiver and said second receiver, said selector switch selectively applying a signal received on said antenna to either said first receiver or said second receiver in response to a first control signal and a second control signal, respectively;

a detector, said detector generating a detector signal indicating one of a first state and a second state of said detector; and a controller for transmitting said first and second control signals to said selector switch in response to a state of said detector, wherein when said detector signal indicates said first state, said controller generates said first control signal such that said selector switch connects said antenna to first said receiver, and when said detector signal indicates said second state, said controller generates said second control signal such that said selector switch connects said antenna to said second receiver, and wherein said first signal is a remote control signal from a remote control unit and said first receiver is adapted for receiving said remote control signal.

2. An on-vehicle receiving system according to claim 1, wherein said second receiver is an AM/FM radio receiver.

3. An on-vehicle receiving system according to claim 1, wherein said remote-controlled receiver is part of a keyless entry system for said vehicle.

4. An on-vehicle receiving system according to claim 1, wherein said remote-controlled receiver is part of a car security system for said vehicle.

5. An on-vehicle receiving system according to claim 2, wherein said remote-controlled receiver, said radio receiver, said detector, and said controller are a single integrated unit.

6. An on-vehicle receiving system according to claim 2, wherein said remote-controlled receiver and said radio receiver are separate units.

7. An on-vehicle receiving system according to claim 2, wherein portions of said AM/FM radio receiver are shared by said remote-controlled receiver.

8. An on-vehicle receiving system according to claim 7, wherein said shared portions of said AM/FM radio receiver include:

an intermediate frequency amplifier; and a phase detector, wherein said remote-controlled receiver and said radio receiver use a same intermediate frequency and a same modulation/demodulation form.

9. An on-vehicle receiving system according to claim 7, wherein said remote-controlled receiver and said radio receiver operate on a same frequency and said shared portion of said AM/FM radio receiver includes a front end processor.

10. An on-vehicle receiving system, comprising:

a first receiver which receives a first signal;

a second receiver which receives a second signal differing from the first signal;

an antenna, said antenna adapted to receive said first signal and said second signal;

a selector switch coupled to said antenna, thereby selectively applying a signal received on said antenna to either said first receiver or said second receiver;

a detector, said detector indicating a first state and a second state; and a controller coupled to operate said selector switch in response to a state of said detector, whereby when said detector indicates said first state said controller operates said selector switch to connect said antenna to said first receiver, and when said detector indicates said second state said controller operates said selector switch to connect said antenna to said second receiver;

wherein said detector includes a key detector for detecting if an ignition key is inserted into a key cylinder of said vehicle and said detector indicates said first state when said ignition key is removed from said key cylinder and said detector indicates said second state when said ignition key is inserted in said key cylinder.

11. An on-vehicle receiving system, comprising:

a first receiver which receives a first signal;

a second receiver which receives a second signal differing from the first signal;

an antenna, said antenna adapted to receive said first signal and said second signal;

a selector switch coupled to said antenna, thereby selectively applying a signal received on said antenna to either said first receiver or second receiver;

a detector, said detector indicating a first state and a second state; and a controller coupled to operate said selector switch in response to a state of said detector, whereby when said detector indicates said first state said controller operates said selector switch to connect said antenna to said first receiver, and when said detector indicates said second state said controller operates said selector switch to connect said antenna to said second receiver;

wherein said detector detects a state of an ACC switch of an ignition of said vehicle, said detector indicating said first state when said ACC switch is off and said detector indicating said second state when said ACC switch is on.

12. An on-vehicle receiving system, comprising:

a remote-controlled receiver to receive a radio signal from a remote control unit;

a radio broadcast signal receiver, wherein portions of said radio broadcast receiver are shared by said remote-controlled receiver;

an on-vehicle antenna, said antenna adapted for receiving said signal from said remote control unit and radio broadcast signals, said antenna being connected to said remote-controlled receiver and to said radio receiver;

a selector switch, said selector switch selectively connecting said on-vehicle antenna and said shared portions of said radio broadcast receiver to either said remote-controlled receiver or said radio receiver;

a key detector, said key detector indicating a first state and a second state, said key detector indicating said first state when an ignition key is inserted into a key cylinder of said vehicle, said key detector indicating said second state when said ignition key is removed from said key cylinder; and a controller coupled to operate said selector switch in response to a state of said key detector, whereby when said key detector indicates said first state said controller causes said selector switch to connect said antenna and said shared portions of said radio broadcast signal receiver to said radio receiver and when said key detector indicates said second state, said controller causes said selector to connect said antenna and said shared portions of said radio broadcast signal receiver to said remote-controlled receiver.

13. An on-vehicle receiving system according to claim 12, wherein said remote-controlled receiver and said radio receiver operate on a same frequency and said shared portion of said radio broadcast signal receiver includes a front end processor.

14. An on-vehicle receiving system according to claim 12, wherein said remote-controlled receiver is part of a keyless entry system for said vehicle and said controller includes a drive circuit for locking and unlocking a door of said vehicle in response to a signal from said remote-controlled unit.

15. An on-vehicle receiving system, comprising:

a remote-controlled receiver adapted to receive a radio signal from a remote control unit;

a radio broadcast signal receiver;

an on-vehicle antenna, said on-vehicle antenna adapted for receiving said radio signal from said remote control unit and radio broadcast signals;

a selector switch for selectively connecting a signal received on said on-vehicle antenna to either said remote-controlled receiver or said radio broadcast signal receiver;

a detector for detecting when an ACC switch of said vehicle is turned on by an ignition key of said vehicle; and a controller coupled to operate said selector switch in response to a state of said detector, whereby when said detector detects that said ACC switch is on, said controller operates said selector switch to connect said on-vehicle antenna to said radio broadcast signal receiver and when said detector detects that said ACC switch is off, said controller operates said selector switch to connect said on-vehicle antenna to said remote-controlled receiver.

16. An on-vehicle receiving system according to claim 15, wherein said remote-controlled receiver is part of a keyless entry system of said vehicle and said controller includes a drive circuit for locking and unlocking a door of said vehicle in response to a signal from said remote control unit.

17. An on-vehicle receiving system according to claim 15, wherein said remote-controlled receiver is part of a security system for said vehicle.

18. An on-vehicle receiving system according to claim 15, wherein said remote-controlled receiver, said radio receiver, said detector, and said controller are a single integrated unit.

19. An on-vehicle receiving system, comprising:

means for receiving a radio signal from a remote control unit;

means for receiving a radio broadcast signal;

an antenna adapted for receiving said remote-controlled signal and said radio broadcast signal; and means for selectively connecting a signal received by said antenna to either said means for receiving a remote control signal or said means for receiving a radio broadcast signal.

20. A method of selectively connecting signals to an on-vehicle receiving system wherein said on-vehicle receiving system includes a remote control unit receiver and a radio broadcast receiver, said method comprising the steps of:

providing an antenna adapted for receiving a remote-control signal and a radio broadcast signal; and selectively connecting said antenna to either said remote control unit receiver or said radio broadcast receiver.

* * * * *